July 10, 1945.  H. O. VOGEL  2,380,347
DISTRIBUTOR FOR MATERIAL SPREADERS
Filed March 5, 1942  2 Sheets-Sheet 1

Inventor:
Hitmond O. Vogel.
By Paul O. Pippel
Atty.

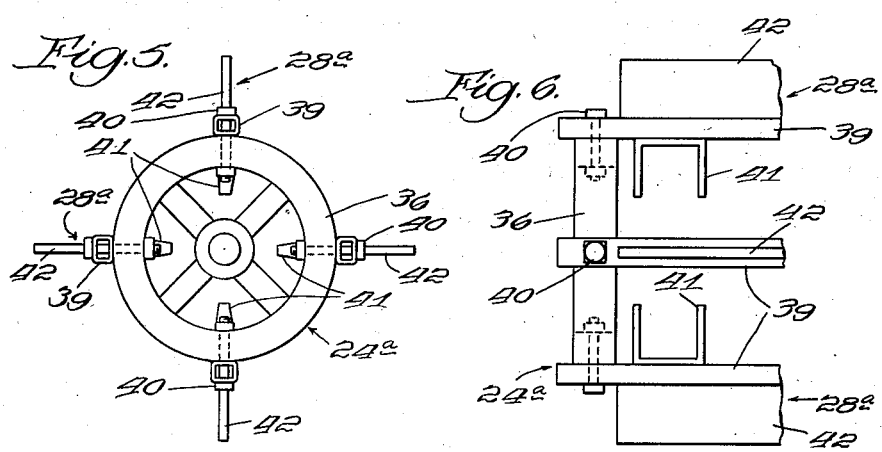
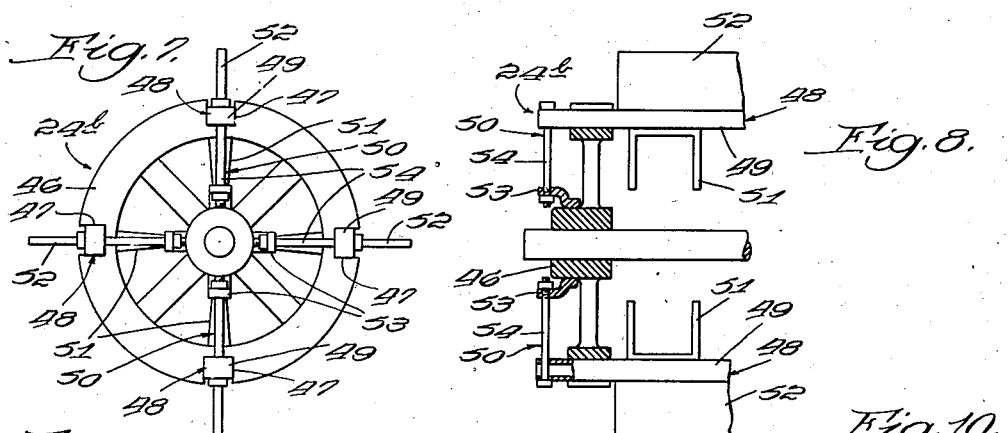
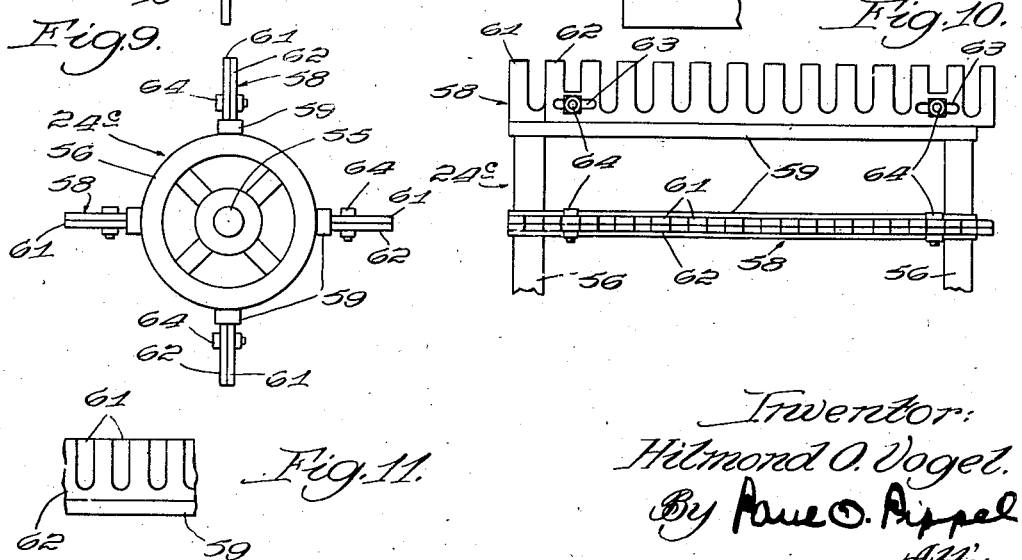

Patented July 10, 1945

2,380,347

UNITED STATES PATENT OFFICE 2,380,347

DISTRIBUTOR FOR MATERIAL SPREADERS

Hilmond O. Vogel, Chicago, Ill., assignor to International Harvester Company, a corporation of New Jersey Application March 5, 1942, Serial No. 433,456

5 Claims. (Cl. 275—3)

This invention relates to improvements in material spreaders and particularly spreaders for manure and fertilizer for agricultural purposes. More specifically the invention pertains to an improved distributor adapted for the distribution of different types of material.

In the fertilizing of fields, it is often desirable to distribute lime or other pulverulent material instead of manure. Because of the differences in the weights of these different materials, it has heretofore has been necessary to employ either a different form of distributor or to provide the regular spreader with an attachment adapted to handle the lime. The principal characteristic of the distributor capable of distributing lime or similar material is a plurality of blades or other generally imperforate members adapted to discharge the lime at the rear of the spreader or other machine so equipped. In the distribution of heavier materials such as manure, the distributor is usually equipped with toothed portions so that the material is chopped up or reduced prior to distribution. In one particular distributor heretofore known, the distributor has been converted or equipped to handle finer material by the attachment of blade portions to the teeth. However, it has been found that the labor involved in attaching and detaching these blades does not result in an efficient use of the spreader. Further, since these blades must be completely detached from the distributor, they often become lost or misplaced. According to the present invention these disadvantages are eliminated, and an improved convertible distributor is provided.

An important object of the invention is the provision of an improved distributor capable of use in the distribution of different types of material, particularly manure and lime.

Another important object of the invention is the provision of a distributor which is initially equipped to handle both types of material and which is adapted for use with either type of material, the distributor portions for one type of material being retracted or otherwise disposed in an inoperative phase while the other distributor portions are being utilized.

Another object is to provide a distributor in the form of a generally cylindrical cage structure having a plurality of transverse bars, each carrying at opposite sides thereof distributor portions adapted to handle different material, these bars being so arranged as to be reversible so that either distributor portion may be selectively used independently of the other.

Another object, in a modified form of the invention, is to provide a distributor including a plurality of spaced teeth especially adapted for the distribution of one type of material and to provide means for closing the spaces between the teeth to provide, in effect, a substantially imperforate distribution portion especially adapted for the distribution of another type of material.

The foregoing and other important objects of the invention will become apparent from an examination of the following detailed description and accompanying sheets of drawings, in which:

Figures 5 and 6 are respectively end and partial side elevations of a modified form of distributor;

Figures 7 and 8 are views similar to Figures 5 and 6 showing another modified form of the invention;

Figures 9 and 10 are respectively end and side elevational views of another modified form of the invention; and Figure 11 is a fragmentary view of a portion of the structure shown in Figure 10.

Although reference is had herein to the use of the invention in connection with the distribution of different types of fertilizer, it will be apparent that the invention has further utility in the distribution of other types of material, and it is, accordingly, not intended to restrict the scope of the invention by the specific disclosure.

Figure 1:
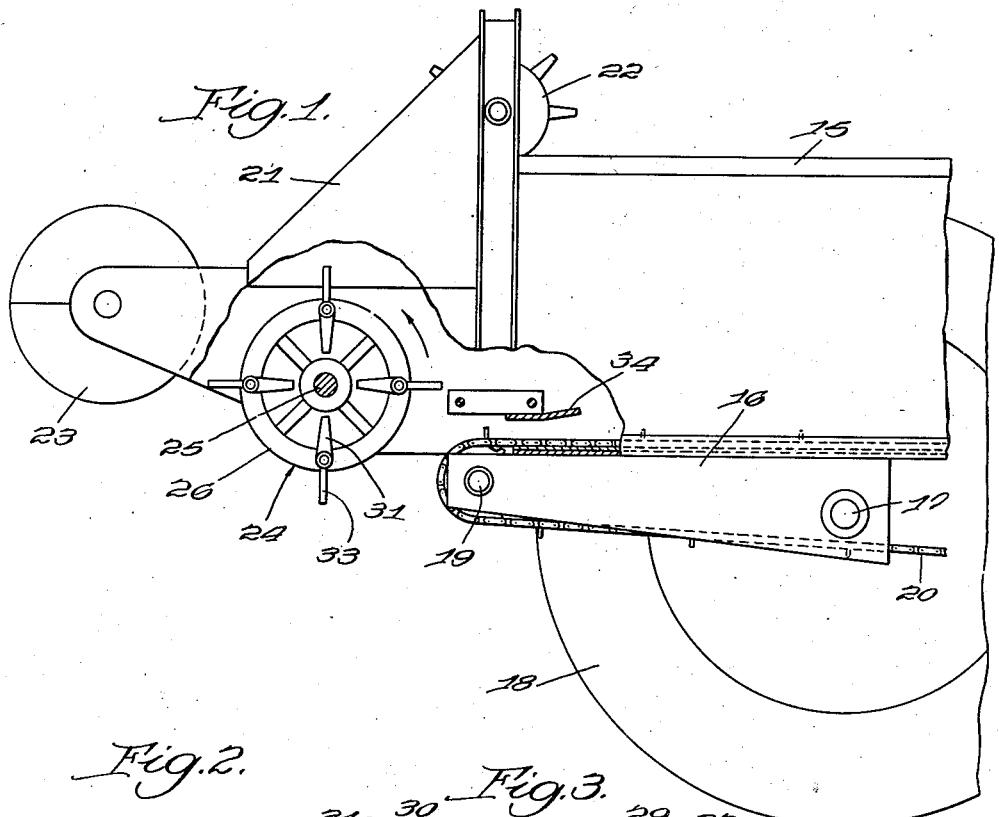
Figure 1 is a side elevational view partly in section showing the invention as embodied in a conventional type manure spreader, only the rear portion of the spreader being shown.

The spreader construction illustrated in Figure 1 may be and is shown as of a conventional type including a longitudinally extending spreader body 15 having rear supporting structure 16 which carries a transverse axle 17. This axle is equipped with wheels 18, only one of which is shown. The supporting structure 16 carries at its rear end a transversely extending shaft 19 which carries sprockets supporting a longitudinally running, endless apron or feeder conveyer 20. The construction just described is that ordinarily employed in manure spreaders. The rear portion of the body 11 is provided with additional supporting structure, generally indicated at 21, which carries an upper transverse distributor or beater 22, a rear distributor 23, and a lower distributor 24. These distributors may be driven in any suitable manner by driving mechanism, not shown.

Figure 2:
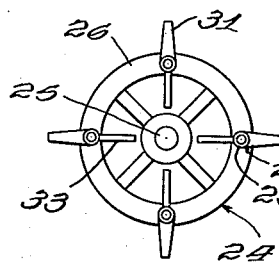
Figure 2 is an end elevation of the distributor shown in Figure 1.
Figure 3:
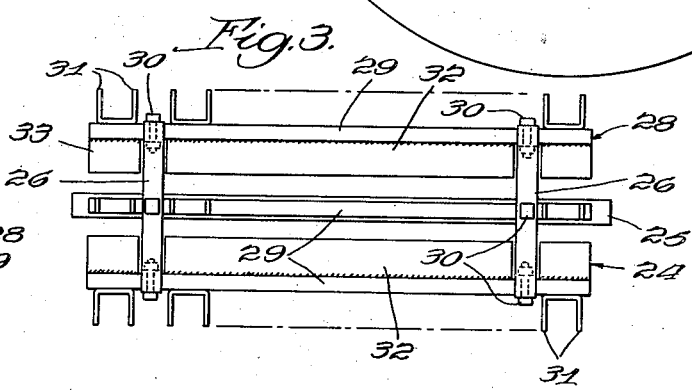
Figure 3 is a side view of same.
Figure 4:
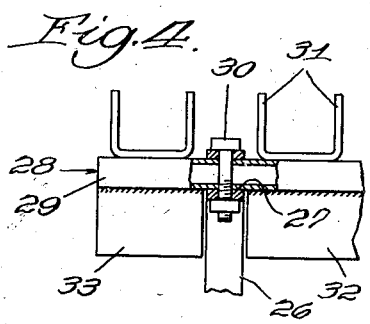
Figure 4 is an enlarged fragmentary view partly in section showing means for attaching the reversible distributor element to the distributor.

The present invention consists in improvements in structure for the beater 24. As illustrated, this beater is carried on a transverse shaft 25, at opposite ends of which are provided carrier members 26. These members are generally circular and are spaced apart axially of the shaft 25. The periphery of each carrier member is substantially continuous and at circumferentially spaced portions thereof is provided with openings 27 providing bearings for the supporting of transverse distributor elements 28. Each element includes a transverse bar or supporting member 29 having opposite ends respectively carried in the openings 27 in the carriers 26. As shown in Figures 2, 3, and 4, each bar is preferably in the form of a tubular member. These bars are held in the carrier member by a plurality of individual securing means, in the present instance illustrated as a bolt and nut 30. As best shown in Figure 3, each bar 29 carries along one edge thereof a distributor portion consisting of a plurality of spaced teeth 31. In the present case, these teeth are formed by the provision of a plurality of U-shaped members having their leg portions extending radially outwardly from the shaft axis. Each bar carries at an edge portion diametrically opposite that along which the teeth are carried a second distributor portion consisting of a transversely extending blade 32. The end portions of the bars that extend beyond the carrier members 26 are equipped with auxiliary blade portions 33. The structure just described provides a cylindrical cage from which the teeth 31 project radially outwardly, in one position of the bars 29. According to the present invention the bars 29 are reversible in the distributor, this being accomplished by removal of the securing means 30 and turning of the bars 29 so that the blades 32 and 33 extend radially outwardly and the teeth 31 extend radially inwardly. The securing means are then replaced.

When the structure is to be used for the distribution of manure or other heavy material, the distributor or beater 24 is assembled as shown in Figure 3, in which instance the teeth 31 extend radially outwardly of the distributor for operation in a circular path. The direction of rotation of the distributor is indicated by the arrow in Figure 1. In this case, the teeth 31 function in the usual manner to aid in the reduction of the material prior to spreading by the rear beater 23. As shown in Figure 1, the beater 24 is assembled with the blades 32 and 33 projecting outwardly, in which case the spreader is adapted for the distribution of lime or other pulverulent material. The teeth 31 now extend radially inwardly from the shaft 25 and are out of the path of operation of the blades 32. The lime is moved rearwardly toward the beater 24 by the conveyor or apron 20. A transverse shield 34 is provided in the spreader body 15 slightly above the rear portion of the upper run of the apron 20. This shield provides for the deflection of the greater quantity of lime directly into the path of the blades 32 and 33 of the beater 24, thus preventing the dropping of lime directly to the ground from the end of the apron.

In the modified structure shown in Figures 5 and 6, there is illustrated a distributor 24a. This distributor has carrier members 36 very similar to the members 26 in the distributor 24. A plurality of distributor elements 28a is carried by the members 36. Each element includes a transverse bar 39 having at one edge thereof a plurality of teeth 41 and at the opposite transverse edge a blade 42. The bars 39 are secured to the carriers 36 for reversibility, removable securing means 40 being provided for this purpose. In the structure just described, the bars 39 are readily removable from the carriers 36, being mounted directly on the outer peripheries of these members. The use of this distributor is identical to that of the distributor 24.

Figures 7 and 8 illustrate a modified form of beater 24b. This beater includes carrier members 46 having their outer peripheries notched at circumferentially spaced intervals as at 47 These notches serve to mount, respectively, distribtuor elements 48, each element consisting of a bar or support 49 having opposite edges provided respectively with teeth 51 and a blade 52. Each bar is held in position on the carrier by a securing means 50. In this case each securing means comprises a lug 53 secured to the hub of a carrier member 46. A bolt 54 passes through a bar 49 and a lug 53. These bolts are, of course, removable for the purpose of permitting reversal of the distributing elements 48 for conversion of the distributor from one type to another.

Figures 9 and 10 illustrate a further modified form of distributor 24c including a shaft 55 and a pair of axially spaced carriers 56. These carriers mount at circumferentially spaced points thereon a plurality of distributor elements 58. Each element consists of a transverse bar 59 paralleling the shaft 55 and rigidly secured to the carriers 56. Each bar is formed with a plurality of spaced teeth 61, these teeth corresponding generally with the teeth 31 of the distributor 24. According to the present form of the invention, the means for converting the distributor from one type to another comprises a plurality of closure members 62 respectively associated with the distributor elements 58. Each member 62 comprises a plurality of teeth spaced according to the spacing between the teeth 61. A portion of each member adjacent the distributor bar 59 is provided with a pair of slots 63 generally paralleling the bar 59. A pair of bolts 64 extends through the toothed portion 61 and through these slots. These bolts are provided with nuts, and the relationship of parts is such as to provide for shifting of the member 62 axially of the beater 24c. When this beater is to be used for the distribution of manure or other heavy material, the parts are arranged as shown in Figure 10, in which case the spaces between the teeth 61 are opened. In the conversion of the beater for use in the distribution of lime, the bolts 64 are loosened and the members 62 are shifted endwise or axially of the beater so that the imperforate portions on the members respectively close the spaces between the teeth 61, as shown in Figure 11. In this manner, the distributor elements 58 is made generally imperforate and is suitably adapted to handle the lime.

From the foregoing description, it will be seen that the invention provides fundamentally a convertible type of distributor which is adapted for use in the distribution of different kinds of material. In all forms of the invention, the main object is to provide for this conversion by the arrangement of distributor portions which do not have to be detached and stored pending the use of other portions. In the beaters shown in Figures 1 to 8, the distributor elements are reversible so that either of the teeth blades may be used independently of the other. Although in the structures illustrated the teeth and blades are diametrically opposed on the supporting bars, it will be obvious that any other form of suitable arrangement may be used, such as the provision of an angle of 90 degrees between the plane of the teeth and the plane of the adjacent blade. In the structure shown in Figure 10, the member 62 is adapted to be retracted from the path of operation of the teeth 61 so that the distributor may function in its usual manner as a toothed beater for the distribution of heavy types of material. The members 62 are always in place, however, to be shifted into positions to cooperate with the teeth 61 to provide imperforate distributor portions for the distribution of light types of material.

It will be appreciated that the foregoing description has referred to only preferred embodiments of the invention, and that numerous modifications and alterations in these preferred forms may be made without departing from the spirit and scope of the invention, as defined in the appended claims.

What is claimed is:

1. A distributor means for a material spreader, comprising a rotatable, generally cylindrical cage structure including a plurality of distributor elements disposed in the cage in circumferentially spaced relation, each element having a toothed portion and an angularly related blade portion, means mounting each element in the cage for positioning of said element in either of two positions, in one position the toothed portions extending radially outwardly from the cage and the blade portions being disposed within the periphery of the cage and in the other position the relative disposition of the bade and toothed portions being reversed.

2. A distributor for a material spreader, comprising a rotatable shaft, a pair of carrier members in axially spaced relation on the shaft, a bar carried by said members in radially spaced relation to the shaft, toothed distributor means carried by the bar along one edge thereof, a second distributor means including a blade carried along another edge of said bar in diametrically opposed relation to the toothed means, and means mounting the bar in the carrier member for angular adjustment about the axis of the bar for disposition of the bar in either of two positions whereby the blade means or the toothed means may be selectively arranged to project radially outwardly from the shaft in material-distributing position.

3. For a material spreader having a longitudinal body, a rotatable distributor comprising a pair of transversely spaced carrier members carried by the body for rotation about an axis transversely of the body, a bar carried by said members in radially spaced relation to the axis of rotation, a first distributor means carried by the bar along and projecting from one edge thereof, a second distributor means carried along and projecting from another edge of said bar in angled relation to the first means in an amount greater than 90°, and means mounting the bar in the carrier member for angular adjustment about the axis of the bar for disposition of the bar in either of two positions whereby the first means or the second means may be selectively arranged to project radially outwardly from the axis of rotation in material-distributing position.

4. For a material spreader having a longitudinal body: distributor means convertible to handle either of two types of material, comprising a carrier movably carried by the body, a dual-purpose distributor element having a first portion adapted to distribute one type of material and a second portion adapted to distribute another type of material, and means mounting said element in the carrier for selective extension of either portion into material-distributing position and retraction of the other portion to a position within the carrier.

5. For a material spreader having a longitudinal body: distributor means comprising a carrier disposed in the body for rotation about a transverse axis and including a plurality of bars arranged in circumferentially spaced relation to form generally a cylindrical cage structure about the axis of rotation, means mounting each bar for angular adjustment about a transverse axis paralleling the axis of rotation, a plurality or set of first distributor elements, each including a plurality of transversely spaced teeth arranged along and projecting from one edge of a respective bar, and a plurality or set of second distributor elements, each comprising a blade extending transversely along and projecting from an opposite edge of a respective bar, the aforesaid mounting means providing for disposition of the bars with either set of distributor elements projecting radially outwardly from the bars and the other set of elements extending radially inwardly from the bars toward the axis of rotation.

HILMOND O. VOGEL.